Oct. 1, 1929.  G. ALEXANDER  1,730,027
AUTOMOBILE SIGNAL
Filed May 10, 1924
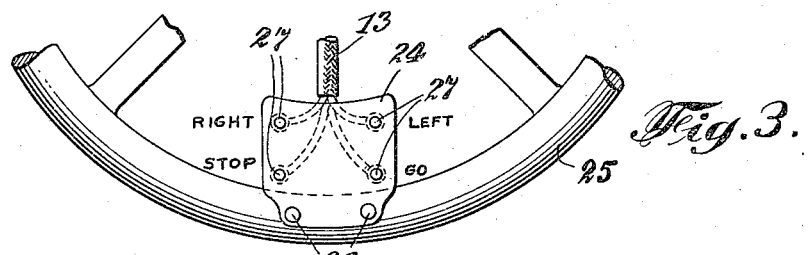
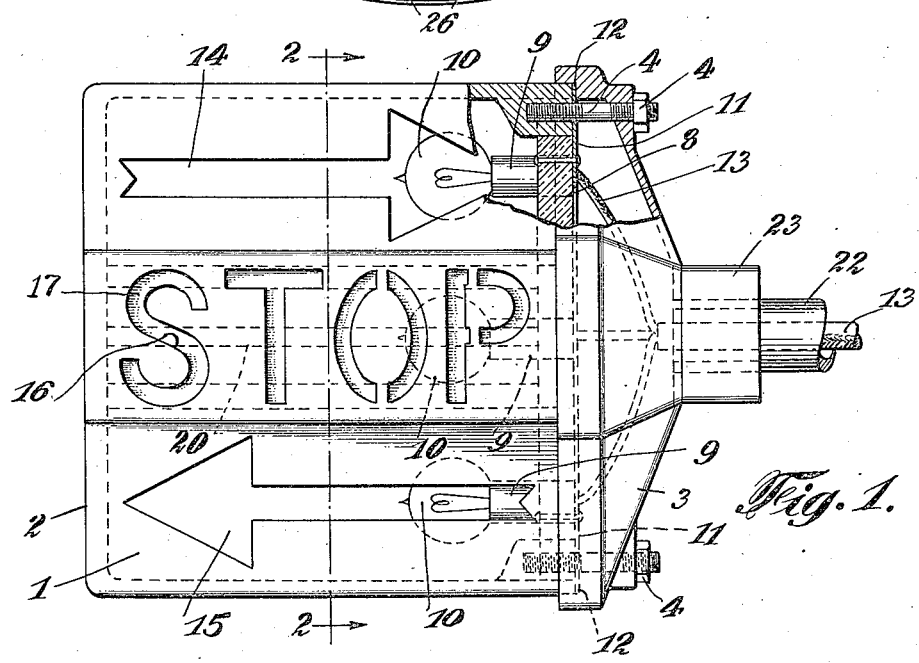
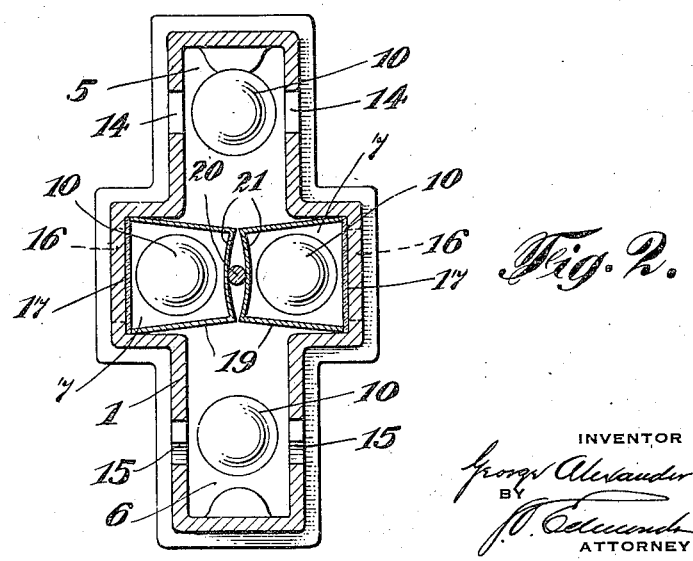

Patented Oct. 1, 1929

1,730,027

UNITED STATES PATENT OFFICE

GEORGE ALEXANDER, OF HAMILTON, ONTARIO, CANADA, ASSIGNOR OF ONE-HALF TO AMELIA CRAVEN, OF MATAWAN, NEW JERSEY

AUTOMOBILE SIGNAL

Application filed May 10, 1924. Serial No. 712,190.

This invention relates to automobile signals, and more particularly relates to illuminated electric signals for automobiles or other vehicles whereby intended movements of the vehicles may be indicated by the driver.

One of the objects of my invention is to provide a signal device which is inexpensive to manufacture, durable and light in construction, simple and efficient in operation, and one which may be mounted in place on an automobile or other vehicle readily and easily without marring or damaging the vehicle body.

Another object of my invention is to provide a signal device which has no movable parts, and one which may be so mounted on a vehicle that the signal is readily discernible both from the front and from the rear thereof.

A further object of my invention is to provide a vehicle signal that may be mounted at any desired place on an automobile body or top, and which may be actuated readily and easily by the driver without requiring the driver to remove his hands from the steering wheel.

Other objects of my invention will be in part obvious and in part pointed out hereinafter.

My invention accordingly consists in the features of construction, combinations of elements, and arrangement of parts which will be hereinafter set forth, and the scope of the application of which will be indicated in the claims that follow.

In order that a clearer understanding of my invention may be had, attention is hereby directed to the accompanying drawings, forming a part of this application, and illustrating one possible embodiment of my invention.

Referring to the drawings:

Fig. 1 is an elevation of the signal device embodying my invention, certain portions being broken away to show the interior construction;

Fig. 2 is a sectional view of the same, and is taken on the line 2—2 of Fig. 1; and Fig. 3 is an elevation of the operating switch board shown associated with a fragment of a steering wheel.

Similar reference characters refer to similar parts throughout the several views of the drawings.

Referring to the drawings, the signal box 1 preferably comprises an aluminum casting, and is hollow, being closed at the outer end 2. A suitable concaved cover 3, which may also be an aluminum casting, is adapted to be secured over the open end of the box by means of studs and nuts 4 or the like. The box is preferably shaped, in cross-section, in the form of a cross, providing an upper compartment 5, a lower compartment 6, and two central compartments 7. 8 is a base plate of suitable insulating material which is provided with four sockets 9 for the four electric light bulbs 10. Plate 8 sets inside of the end of casting 1, to hold each of the bulbs 10 in one of the compartments of the housing. Plate 8 is held in place by two cleats 11 which are secured thereto and are clamped between the castings 1 and 3, as at 12. Casting 3 is concaved to provide room for electrical conductors 13 leading to the bulbs 10.

At the top of the box 1, the front and rear walls of the compartment 5 have openings 14 in the form of arrows pointing toward the vehicle. The side walls of the lower compartment 6 have similar openings 15 in the form of arrows pointing away from the vehicle. The side walls of the compartments 7 are cut out, as at 16. There is one light 10 in each compartment, and suitably colored mica or other transparent material, such as 17, preferably red, is located behind the openings in the box 1. The word "Stop" shows toward the rear of the box, and the word "Go" shows toward the front of the box. These words can be cut out of the box walls or presented by suitably painting the mica sheets. The four compartments of the box are partitioned off from each other by means of sheet metal pieces 19, preferably of aluminum which are slidable into the box 1 for its full depth and are held in place by a pin 20 which is slid between their adjacent inner walls 21 so as to slightly concave these walls and to prevent the partition members 19 from falling out. The partition members also serve to hold the mica sheets 17 in place.

The box 1 is adapted to be mounted on a vehicle by means of a pipe or tube 22, which is screwed into a boss 23 formed on the cover 3 of the box, and which may be secured to the vehicle in any usual or desired manner, and at any place, as to a corner, side, or top bracket.

Electrical conduits 13 preferably lead through the tube 22 to the various electric bulbs in the box and to a switch plate 24, which is preferably secured to the steering wheel 25 of the vehicle, as by means of pins or screws 26. Preferably there is a button 27 on the plate 24 individual to each light 10 in the signal box, so that the driver can readily and easily cause any desired one of the lights to be lit, by merely pushing upon the corresponding button, without removing his hands from the steering wheel. It is to be understood that a suitable connection is made with the automobile battery, or a separate battery, it being deemed unnecessary to show such battery and connection, as it is usual and well-known. The connection is preferably so made that none of the lights are lit unless one of the buttons 27 is pressed to show a signal. Therefore, there is no drain on the battery from the signal, except when a button is pressed and it is desired to display a signal.

It will be noted that the signal device involves no mechanical movements, is suitable for mounting on various different parts of an automobile body, gives a clear and prominent display of every signal, and may be operated readily and easily by the driver without requiring the driver to remove his hand from the steering wheel.

As many changes could be made in the above construction, and as many apparently widely different embodiments of this invention could be made without departing from the scope thereof, it is intended that all matter contained in the above description or shown in the accompanying drawings be interpreted as illustrative and not in a limiting sense.

What I claim is:—

1. In an automobile signal device, in combination, a hollow housing open at one end, sheet metal partitions removably disposed in said housing dividing the interior of the housing into four compartments, the walls of said housing having signal apertures individual to said compartments, a cover member removably secured to said housing, a base plate in an end of said housing removably secured to said housing, and electric light bulbs carried by said base plate and positioned severally in each compartment of the housing, said partitions comprising a pair of sheet metal members, channel shaped in cross-section and positioned in back to back relationship, said members being insertable into said housing through the open end thereof.

2. In an automobile signal device, in combination, a hollow housing having an open end, sheet metal partitions removably disposed in said housing dividing the interior of the housing into four compartments, the walls of said housing having signal apertures individual to said compartments, a cover member removably secured to said housing, a base plate in an end of said housing removably secured to said housing, and electric light bulbs carried by said base plate and positioned severally in each compartment of the housing, said partitions comprising a pair of sheet metal members, channel shaped in cross-section and positioned in back to back relationship, said members being insertable into said housing through the open end thereof, and means disposed between the back to back walls of said channel shaped partitions operative to concave said walls slightly, whereby said partitions are held in place in said housing.

3. In an automobile signal device, in combination, a hollow housing having an open end, sheet metal partitions removably disposed in said housing dividing the interior of the housing into four compartments, the walls of said housing having signal apertures individual to said compartments, a cover member removably secured to said housing, a base plate in an end of said housing removably secured to said housing, and electric light bulbs carried by said base plate and positioned severally in each compartment of the housing, said partitions comprising a pair of sheet metal members, channel shaped in cross-section and positioned in back to back relationship, said members being insertable into said housing through the open end thereof, said housing having interior shoulders, and the side walls of said partition members being confined between said shoulders.

4. In an automobile signal device, in combination, a hollow housing having an open end, sheet metal partitions removably disposed in said housing dividing the interior of the housing into four compartments, the walls of said housing having signal apertures individual to said compartments, a cover member removably secured to said housing, a base plate in an end of said housing removably secured to said housing, and electric light bulbs carried by said base plate and positioned severally in each compartment of the housing, said partitions comprising a pair of sheet metal members, channel shaped in cross-section and positioned in back to back relationship, said members being insertable into said housing through the open end thereof, said housing having the form of a cross in a direction cross-wise of the partition members, presenting interior shoulders, and said partition members being confined between said shoulders.

5. In an automobile signal device, in combination, a hollow housing, said housing being in the shape of a cross in transverse sectional outline, sheet metal partitions removably disposed in said housing dividing the interior thereof into four compartments, and signal indicia on the longitudinal sides of said housing and individual to said compartments, said partitions being channel shaped, disposed back to back within the housing, and retained by the shoulders formed by the horizontal wing portions of said cross shaped housing.

This specification signed this 1st day of May, 1924.

GEORGE ALEXANDER.